United States Patent [19]

Abe

[11] Patent Number: 5,038,289
[45] Date of Patent: * Aug. 6, 1991

[54] DIAGNOSIS SYSTEM FOR A MOTOR VEHICLE

[75] Inventor: Kunihiro Abe, Higashimurayama, Japan

[73] Assignee: Fuji Jukogyo Kabushiki Kaisha, Tokyo, Japan

[*] Notice: The portion of the term of this patent subsequent to Mar. 26, 2008 has been disclaimed.

[21] Appl. No.: 330,593

[22] Filed: Mar. 28, 1989

[30] Foreign Application Priority Data

Apr. 4, 1988 [JP] Japan .............................. 63-083469

[51] Int. Cl.$^5$ .................... G01M 15/00; F02D 41/26; F02P 17/00
[52] U.S. Cl. .............................. 364/431.01; 73/117.2; 364/551.01
[58] Field of Search ........................ 364/431.01, 424.03, 364/551.01; 73/116, 117.2, 117.3, 119 R, 119 A

[56] References Cited

U.S. PATENT DOCUMENTS

| | | | |
|---|---|---|---|
| 4,527,424 | 7/1985 | Takahashi | 73/119 A |
| 4,694,408 | 9/1987 | Zaleski | 364/551.01 |
| 4,748,843 | 6/1988 | Schäfer et al. | 73/117.3 |
| 4,757,463 | 7/1988 | Ballou et al. | 364/551.01 |

FOREIGN PATENT DOCUMENTS

58-12848   1/1983   Japan .............................. 364/551.01

Primary Examiner—Felix D. Gruber
Attorney, Agent, or Firm—Martin A. Farber

[57] ABSTRACT

A diagnosis system for diagnosing an electronic control system mounted on a vehicle has a signal transmitter for transmitting a data demand signal and a signal demanding termination of transmission of the data. The electronic control system has a signal receiver for receiving the data demand signal and the transmission terminating demand signal from the diagnosis device, and an interpreter for interpreting the content of the received signals and a signal transmitter for transmitting an output signal to the diagnosis device in accordance with the interpretation.

2 Claims, 13 Drawing Sheets

DIAGNOSIS SYSTEM FOR A MOTOR VEHICLE

BACKGROUND OF THE INVENTION

The present invention relates to a diagnosis system for a motor vehicle.

Recently, a motor vehicle has been equipped with an electronic control system for controlling various components of an engine, such as fuel injectors, thereby improving driveability, exhaust gas emission, fuel consumption and engine power. The electronic control system controls the components based on information represented by output signals from various sensors for detecting engine operating conditions. Accordingly, if malfunctioning of components and sensors occurs, the engine does not properly operate.

However, because of the complexity of the electronic control system, it is difficult to immediately find out the trouble. Accordingly, a trouble diagnosis device for easily checking the electronic control system should be provided in an auto shop. The electronic control system has a memory and a communication system to be connected to the trouble diagnosis device.

Japanese Patent Application Laid-Open 58-12848 discloses a diagnosis system in which a bidirectional communication system is provided between the electronic control system and the trouble diagnosis device, thereby diagnosing data based on output signals from various sensors and control data for various actuators in the control system through a single diagnosis device.

When the electronic control system is communicated with the diagnosis device and the diagnosis operation starts, the control system continuously transmits the data signal to the diagnosis device. Accordingly, the load exerted on a central processor unit (CPU) provided in the control system becomes extremely large.

If the speed of the engine increases to a high speed during the continuous data transmission from the control system to the diagnosis device, control programs of the control system such as fuel injection control and ignition timing control are delayed because of the small capacity of the CPU. As a result, the fuel injection and ignition timing can not be properly controlled.

In order to solve such problems, the continuous data transmission from the control system must be stopped by cutting the power for the diagnosis device and by cutting the power for the control system which is done by turning off a key switch of the engine.

Further, the motor vehicle has the electronic control system comprising a plurality of control units for controlling the engine, transmission, brake and cruise control. When these control units are diagnosed, the control units are connected to the diagnosis device through bus lines and connectors.

When one of the control units is in communication with the diagnosis device, the control unit continuously transmits signals to the diagnosis device. Under such a condition, another control unit is not diagnosed. In order to diagnose the other control unit, as described above, the key switch must be turned off to stop the engine to cut off the power of the control units.

Accordingly, whenever the diagnosis for one of the control units terminates, the key switch must be turned off to stop the engine. Thus, diagnosis operation for a plurality of control units can not be easily performed.

SUMMARY OF THE INVENTION

An object of the present invention is to provide a diagnosis system in which the data transmission from an electronic control system to a diagnosis device can be terminated or interrupted without cutting off the power for the control system, thereby reducing load exerted on the control system.

Another object of the present invention is to provide a diagnosis system in which diagnosis can be smoothly performed.

According to the present invention, there is provided a system for diagnosing an electronic control system mounted on a motor vehicle, comprising a diagnosis device, first signal transmitting means provided in the diagnosis device for transmitting a data demand signal and a transmission terminating demand signal to the electronic control system, signal receiving means provided in the electronic control system for receiving the signals from the diagnosis device, interpreting means provided in the electronic control system for interpreting a content of the received data demand signal and the transmission terminating demand signal, and second signal transmitting means provided in the electronic control system for transmitting an output signal to the diagnosis device in accordance with the interpretation through the interpreting means such that a diagnosis operation continues without cutting off power for the electronic control system.

The other objects and features of this invention will become understood from the following description with reference to the accompanying drawings.

DETAILED DESCRIPTION OF THE PREFERRED EMBODIMENTS

Figure 1:
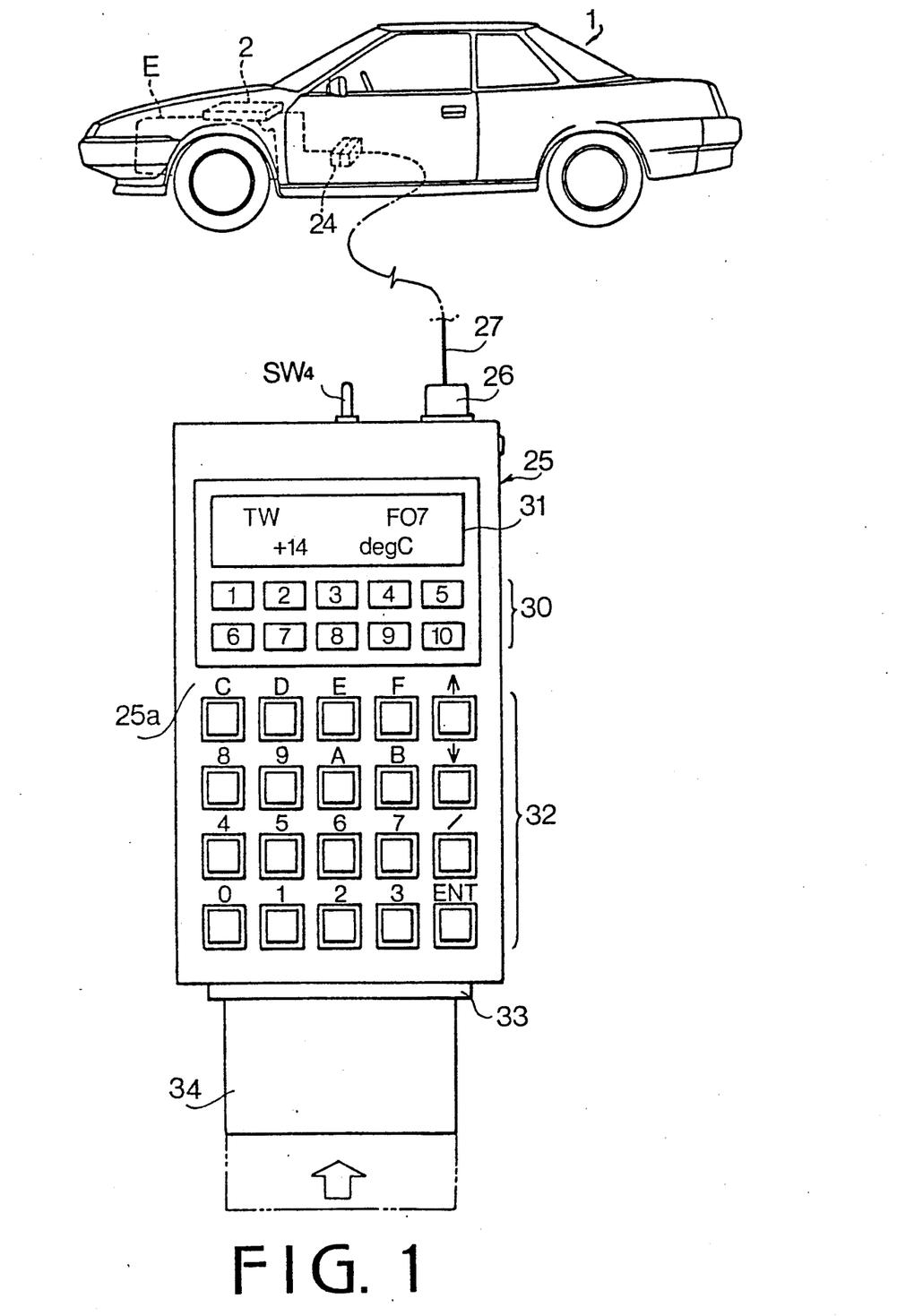
FIG. 1 is a schematic illustration of a diagnosis system according to the present invention.

Referring to FIG. 1, an automobile 1 is equipped with an electronic control system 2 for controlling various components of an engine E. The electronic control system 2 is connected to an external connector 24. A portable diagnosis device 25 comprising a microcomputer is housed in a case 25a and has a connector 26, to which the connector 24 of the system 2 is connected through an adapter harness 27.

The diagnosis device 25 has a power switch SW4, a liquid crystal display 31, an indicator section 30 consisting of a plurality of indicators of LED, and a keyboard 32. A connector 33 is provided for connecting a detachable memory cartridge 34.

Figure 2A:
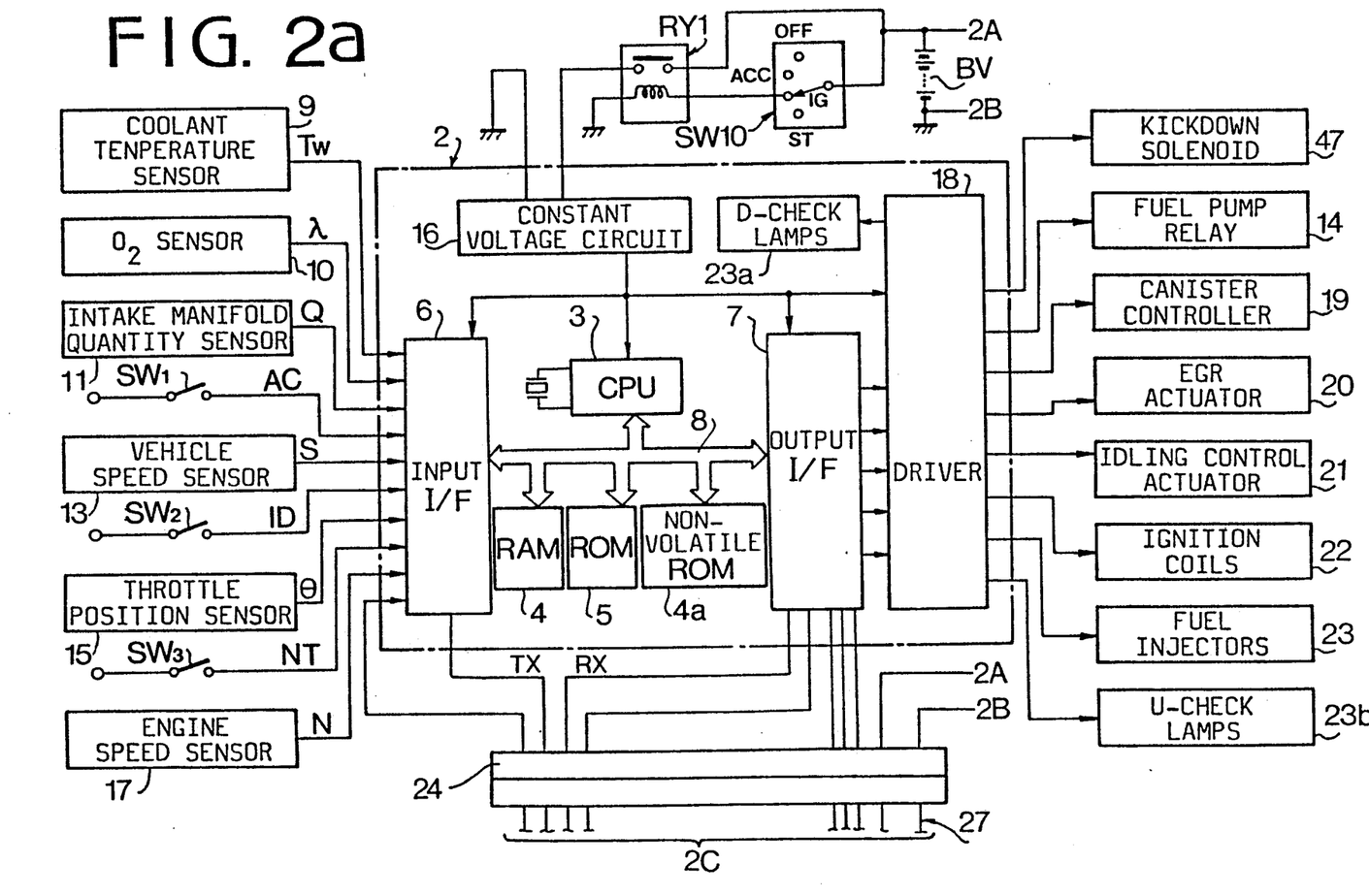
FIGS. 2a and 2b show a block diagram of the system.
Figure 2B:
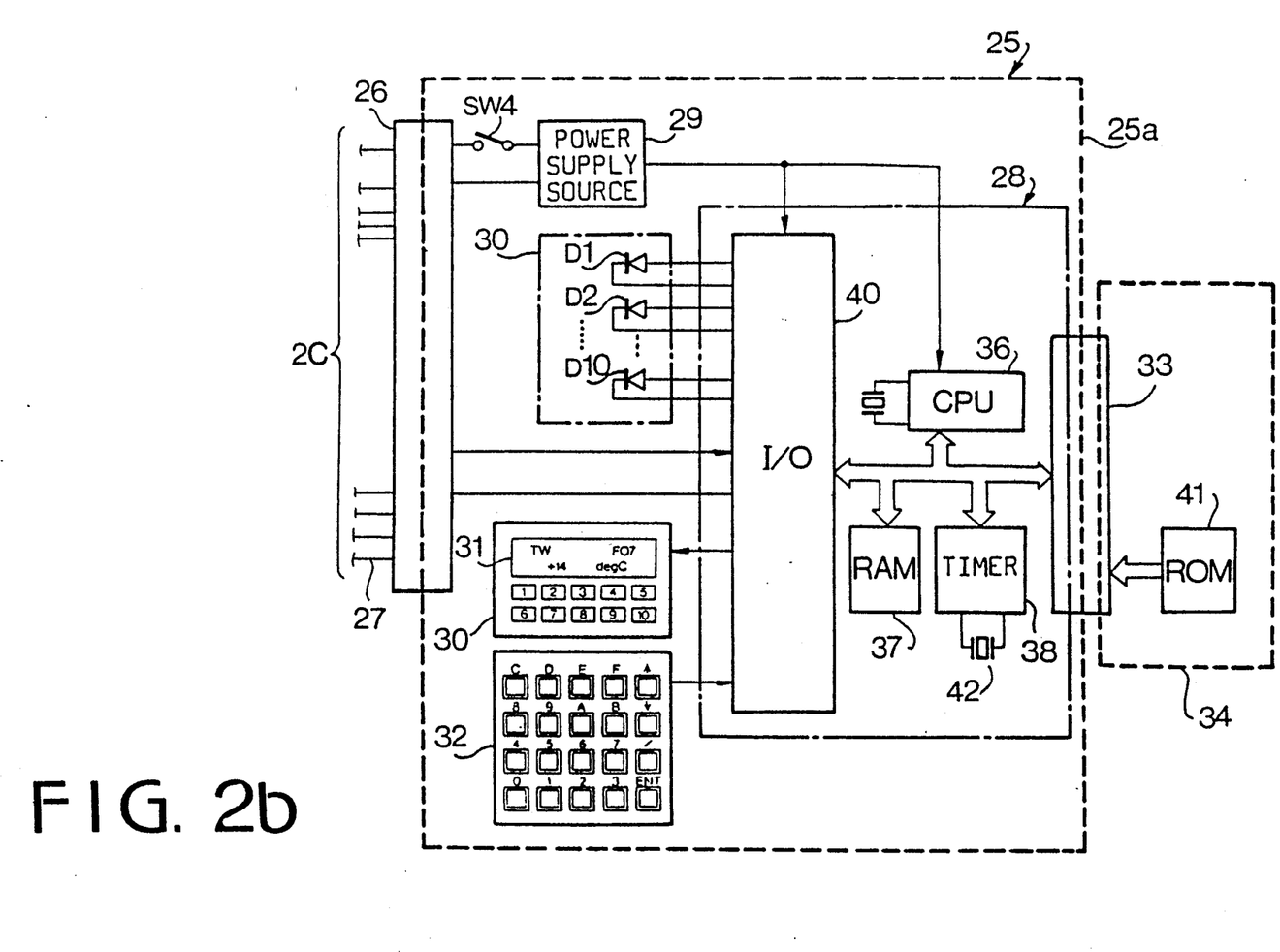

Referring to FIGS. 2a and 2b, the electronic control system 2 comprises a central processor unit (CPU) 3, a random access memory (RAM) 4, a read only memory (ROM) 5, a non-volatile random access memory (non-volatile RAM) 4a, an input interface 6 and an output interface 7. The CPU 3, RAMS 4 and 4a, ROM 5, and the input and output interfaces 6 and 7 are connected to each other through a bus line 8. Programs and data for controlling the engine and fixed data such as the type of the vehicle are stored in the ROM 5. Power is supplied to the CPU 3, input and output interfaces 6 and 7, and driver 18 from a source BV through a contact of a relay RY1 and a constant voltage circuit 16. A coil of the relay RY1 is connected to the source BV through an ignition key switch SW10.

The input interface 6 is applied with a coolant temperature signal Tw from a coolant temperature sensor 9, an air-fuel ratio feedback signal $O_2$ from an $O_2$ sensor 10, an intake-air quantity signal Q from an intake manifold quantity sensor 11, an air conditioner operating signal AC from an air conditioner switch SW1, a vehicle speed signal S from a vehicle speed sensor 13, an idling signal ID from an idle switch SW2, a throttle valve opening degree signal $\theta$ from a throttle position sensor 15, a neutral positioning signal NT from a neutral switch SW3 in a transmission, and an engine speed signal N from an engine speed sensor 17.

These signals are stored in the RAM 4 after processing data in accordance with the program stored in the ROM 5. The CPU 3 produces respective control signals, which are applied to the driver 18 through the output interface 7. The driver 18 produces signals for controlling a kickdown solenoid 12 of a kickdown switch, a fuel pump relay 14, a canister controller 19 of a fuel-vapor emission control system, an EGR (exhaust gas recirculation system) actuator 20, an idling control actuator 21, ignition coils 22 and fuel injectors 23.

The driver 18 further applies signals to D-check lamps 23a and U-check lamps 23b. The D-check lamps 23a are provided in the electronic control system 2 for showing an abnormality in the system 2. When an abnormality is detected in the system 2 by a self-diagnosis function, a corresponding trouble code is read out from the ROM 5 so as to turn on or flash a plurality of lamps 23a, thereby indicating the trouble code. The U-check lamps 23b are provided on a dashboard of the vehicle so as to warn the driver of the trouble detected by the self-diagnosis function.

The diagnosis device 25 has a control unit 28 and a power supply source 29. The control unit 28 comprises a CPU 36, a RAM 37, an input/output (I/O) interface 40, and a timer 38. These elements are connected to each other through a bus line 35. A clock pulse generator 42 is provided in the timer 38 for generating synchronizing pulses.

Inputs of the I/O interface 40 are connected to the output interface 7 of the control system 2 through connectors 24 and 26 and harness 27 so as to receive output signals of the sensors and switches. Outputs of the interface 40 are connected to the indicator section 30. The indicator section 30 has a plurality of LEDs $D_1$ to $D_{10}$ which are operated through switches. When one of the switches is turned on, a corresponding LED of LEDs $D_1$ to $D_{10}$ is lighted or intermittently lighted, so that the operation of the switch can be confirmed. Inputs of the I/O interface 40 are connected to the keyboard 32 for receiving a mode select signal dependent on the operation of the keyboard, and to the output interfaces 7.

Outputs of interface 40 are connected to the input interface 6 and the display 31. The power source 29 for supplying the power to the CPU 36 and I/O interface 40 is connected to the source BV through the power switch SW4.

The memory cartridge 34 selected for diagnosing the presented control system 2 is connected to the diagnosis device 25 through the connector 33. A ROM 41 provided in the memory cartridge 34 stores control programs corresponding to the identification code of the vehicle type and fixed data.

Figure 3:
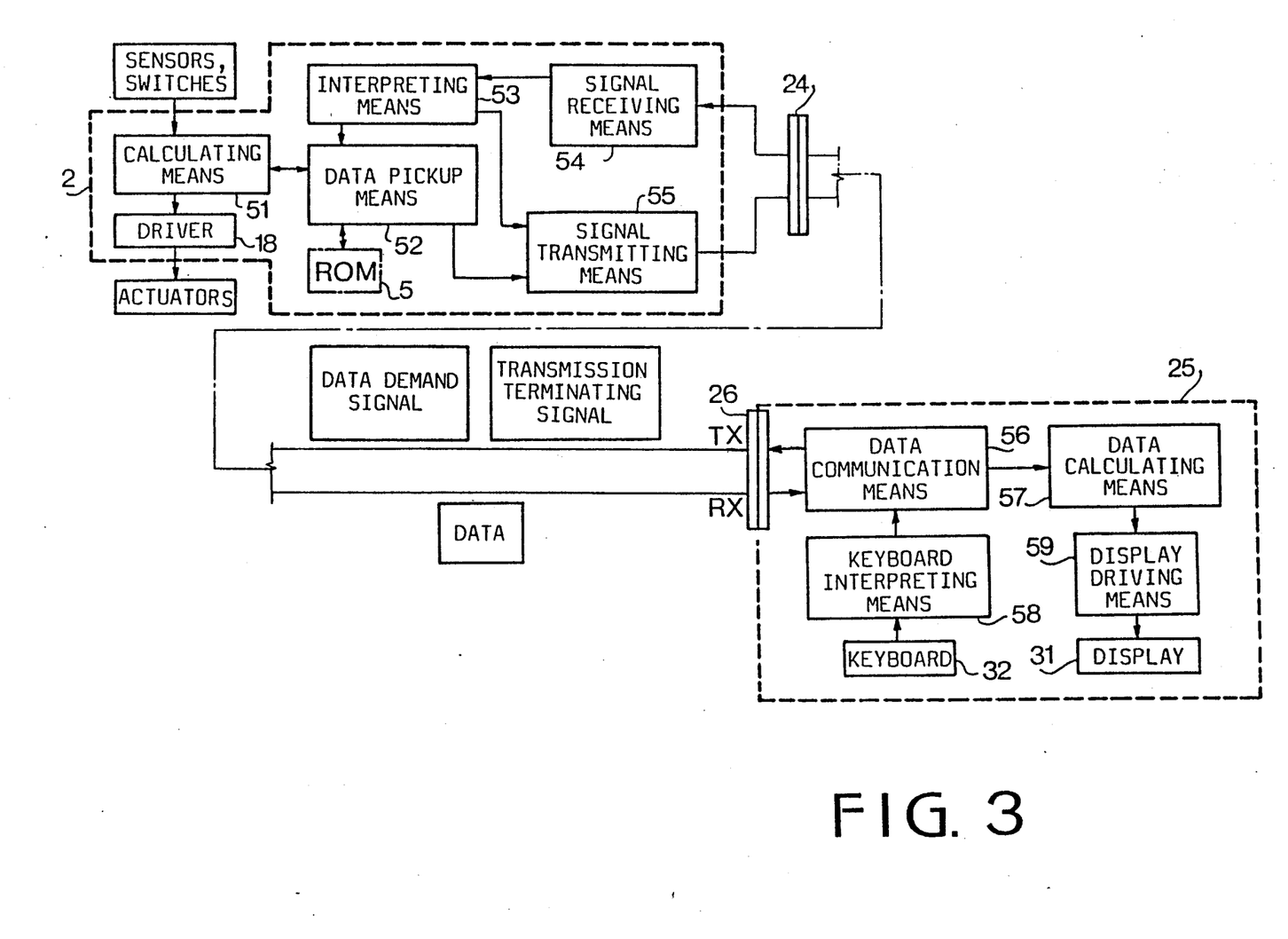
FIG. 3 is a block diagram showing a main part of the system.

Referring to FIG. 3, the electronic control system 2 has calculating means 51 for calculating signals from sensors and switches, and driver 18 connected to the calculating means 51 for supplying actuating signals to respective actuators. A signal receiving means 54 is provided for receiving a data demand signal from the diagnosis device 25. Interpreting means 53 is provided for interpreting the content of the data demand signal and producing a pickup signal which is applied to a data pickup means 52. In accordance with a pickup signal, data pickup means 52 pickup data from data calculated in the calculating means 51 or data stored in ROM 5, and produces a data signal. The data signal is supplied to the diagnosis device 25 through a signal transmitting means 55. These signal receiving means 54 and signal transmitting means 55 are connected to the connector 24 through a bus line.

The control unit 28 of the diagnosis device 25 comprises a keyboard interpreting means 58 provided for interpreting a designated mode input by the keyboard 32. A data communication means 56 retrieves a designated range corresponding to the designated mode of the fixed control program in accordance with the mode signal from the keyboard interpreting means 58. In accordance with a diagnosis program stored in the designated range, the data communication means 56 produces a data demand signal TX which is applied to the control system 2 and receives a data signal RX fed from the control system. A data calculating means 57 calculates the data received at the data communication means 56 for converting the received binary digits into decimal digits. A display driving means 59 produces a signal in accordance with the output of the data calculating means 57 for driving the display 31.

Figure 4A:
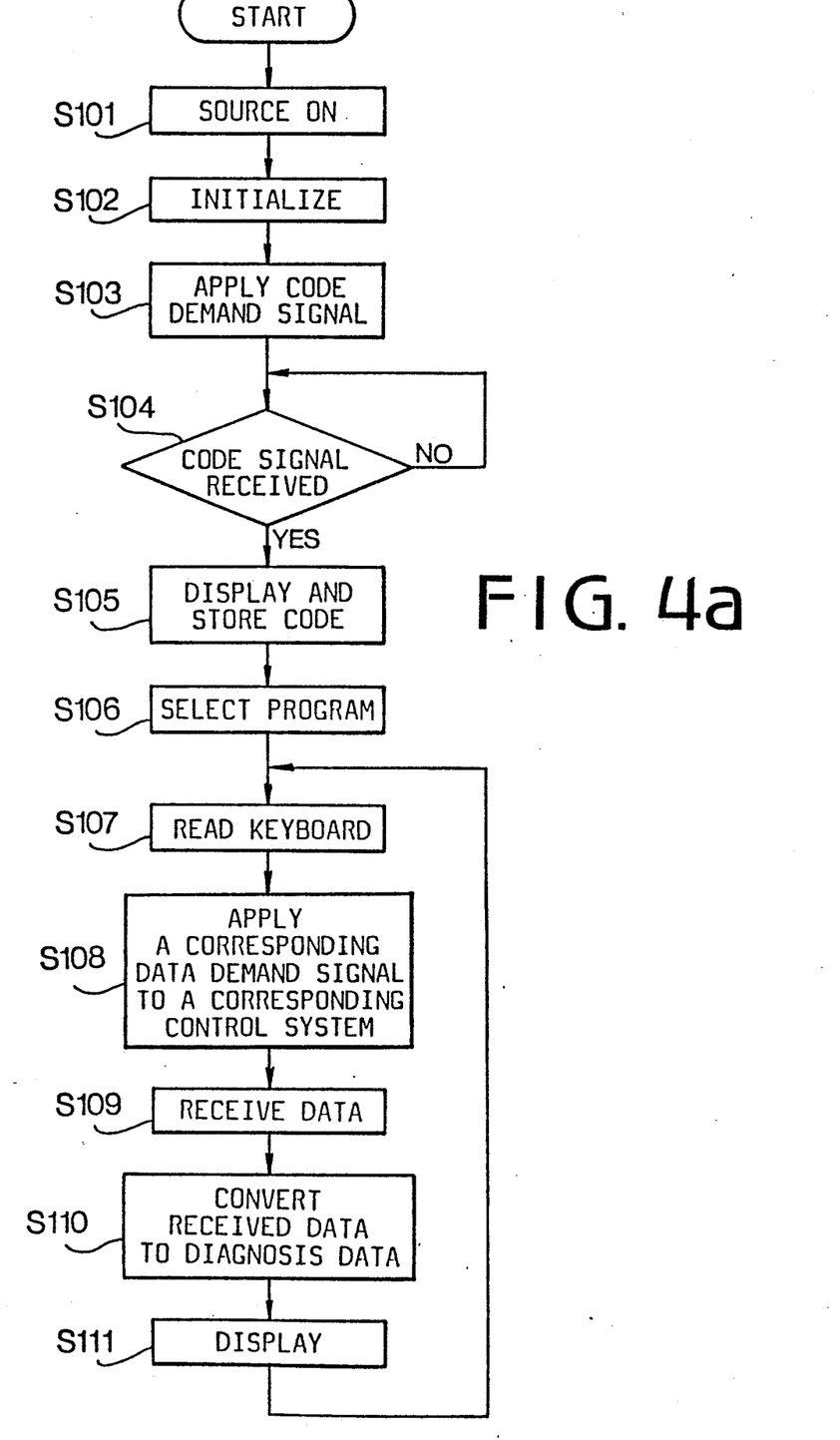
FIG. 4a is a flowchart showing an operation of a diagnosis device in the system.

The operation of the diagnosis system is described hereinafter with reference to the flowchart of FIGS. 4a and 4b. The diagnosis device 25 is connected to the electronic control system 2 through the connectors 24, 26 and harness 27. The engine is started, and the following diagnosis program is performed under the running condition of the engine.

The power switch SW4 is turned on at a step S101. At a step S102, initialization of the control unit 28 is performed. At a step S103, a data demand signal TX from the data communication means 56 is applied to the control system 2. The data demand signal TX is previously stored in the ROM 5.

The data demand signal TX includes a demand signal for demanding an identification code of the control system 2.

Figure 4B:
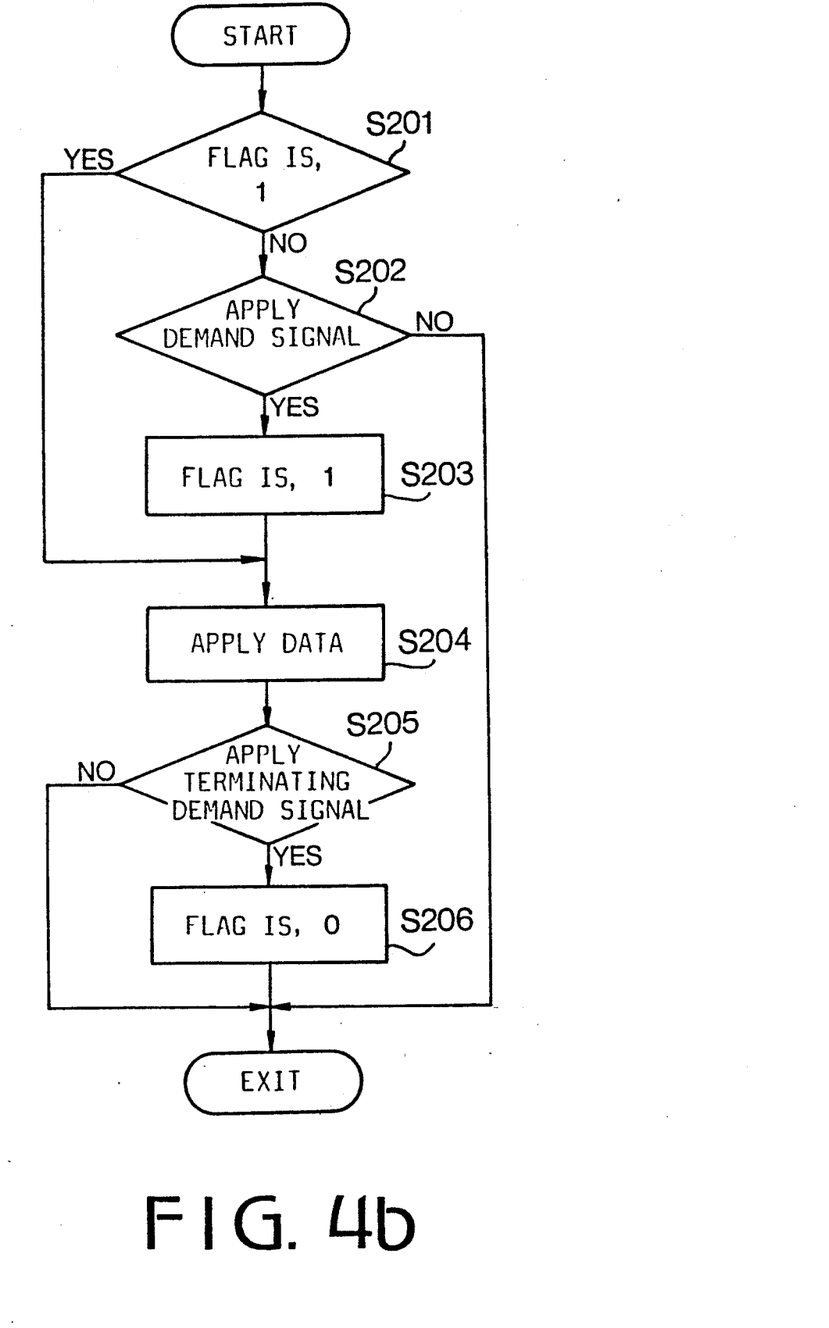
FIG. 4b is a flowchart showing an interrupt routine.

When the data demand signal TX is applied to the control system 2, the program proceeds to a step S201 of an interrupt routine shown in FIG. 4b.

At step S201, it is determined whether a signal transmitting flag corresponding to the data demand signal TX is "1" in the interpreting means 53 or not. If the identification code demand signal is fed for the first time, the signal transmitting flag is "0". Thus, the program goes to a step S202 where the interpreting means 53 determines whether the identification code demand signal is applied to the signal receiving means 54 or not. In this program, since the demand signal is applied, the program proceeds to a step S203. If no signal is applied, the program proceeds to an exit to terminate the interrupt routine.

At step S203, the signal transmitting flag is set to "1", and a signal transmitting start signal is fed from the interpreting means 53 to the signal transmitting means 55. Thus, the signal transmitting means is connected to the diagnosis device 25. The program goes to a step S204 where the interpreting means 53 supplies a signal to the data pickup means 52 to read out an identification code data from the data stored in the ROM 5. A derived identification code data signal is fed from the signal transmitting means 55 to the diagnosis device 25.

At a step S205, it is determined whether the interpreting means 53 receives a signal demanding to terminate the signal transmission from the diagnosis device 25 or not. The transmission terminating demand signal is generated by operating the keyboard to input a corresponding code or by turning off the switch SW4. When the termination of the signal transmission is determined, the program goes to a step S206 where the signal transmitting flag is set to "0" and a terminating signal is applied from the interpreting means 53 to the signal transmitting means 55 to open the transmission line to the diagnosis device 25. When the termination demand signal is not received, the interrupt routine finishes.

When the interrupt routine finishes, the main program is resumed. At a step S104, it is determined whether the identification code signal is applied to the control unit 28 or not. If the identification code signal is applied, the program proceeds to a step S105. If not, the program of step S104 is repeated. At step S105, a received code is stored in a predetermined address of the RAM 37. At a step S106, in accordance with the received code, a program for the type of the control system is selected from the ROM 41 in the cartridge 34. Thus, a diagnosis routine is performed in accordance with the program.

A diagnostician operates the keyboard 32 to perform the diagnosis of the engine control system 1. For example, in order to measure the coolant temperature, a mode code for the coolant temperature (for example F→0→7→ENT) is input by operating the keyboard 32 at a step S107. The input mode is read by the CPU 36 and temporarily stored in the RAM 37. Thereafter, the mode is read and interpreted in the keyboard interpreting means 58. A program according to a mode 07 representing a coolant temperature sensor output data program is read out. At a steps 108, a corresponding data demand signal TX (for example, coolant temperature data) is applied to the control system 2 from the data communication means 56.

In accordance with the data demand signal TX, programs of interrupt routines are started.

At that time, the engine control system 2 is in a signal transmitting state for the identification code demand signal and the signal transmitting flag remains "1". Thus, the program goes from step S201 to step S204 where a data demand signal for coolant temperature is interpreted at the interpreting means 53. The data demand signal TX for coolant temperature is applied to the data pickup means 52. The data pickup means 52 interrupts the identification code pickup operation and operates to pick up coolant temperature data which is supplied to the diagnosis device 25 through the signal transmitting means 55. At a step S109, data signal RX representing a coolant temperature is applied to the data communication means 56 from the control system 2. At a step S110, the received binary digits are converted into decimal digits representing the coolant temperature in the data calculating means 57.

The driving means 59 produces calculated data which is applied to the display 31. At a step S111, a measured value of the coolant temperature, for example, +14 deg C. representing the temperature, an abbreviation mark TW of the coolant temperature, and an input mode indication F07 is displayed on the display 31 as shown in FIG. 1. Thus, the diagnostician can diagnose the items about the coolant temperature.

In order to interrupt the data signal transmitting operation of the control system 2, a predetermined demand code for terminating the signal transmission is input by operating the keyboard 32 or the power switch SW4 of the diagnosis device 25 is turned off, so that a signal transmission terminating demand signal is generated.

The signal transmission terminating demand signal is applied from the data communication means 56 to the control system 2. The program of the control system 2 goes from step S205 to step S206 where the signal transmitting flag is set to "038 . A terminating signal is applied from interpreting means 53 to the data pickup means 52 and the signal transmitting means 55 to terminate the signal transmitting operation of the control system 2.

Figure 5:
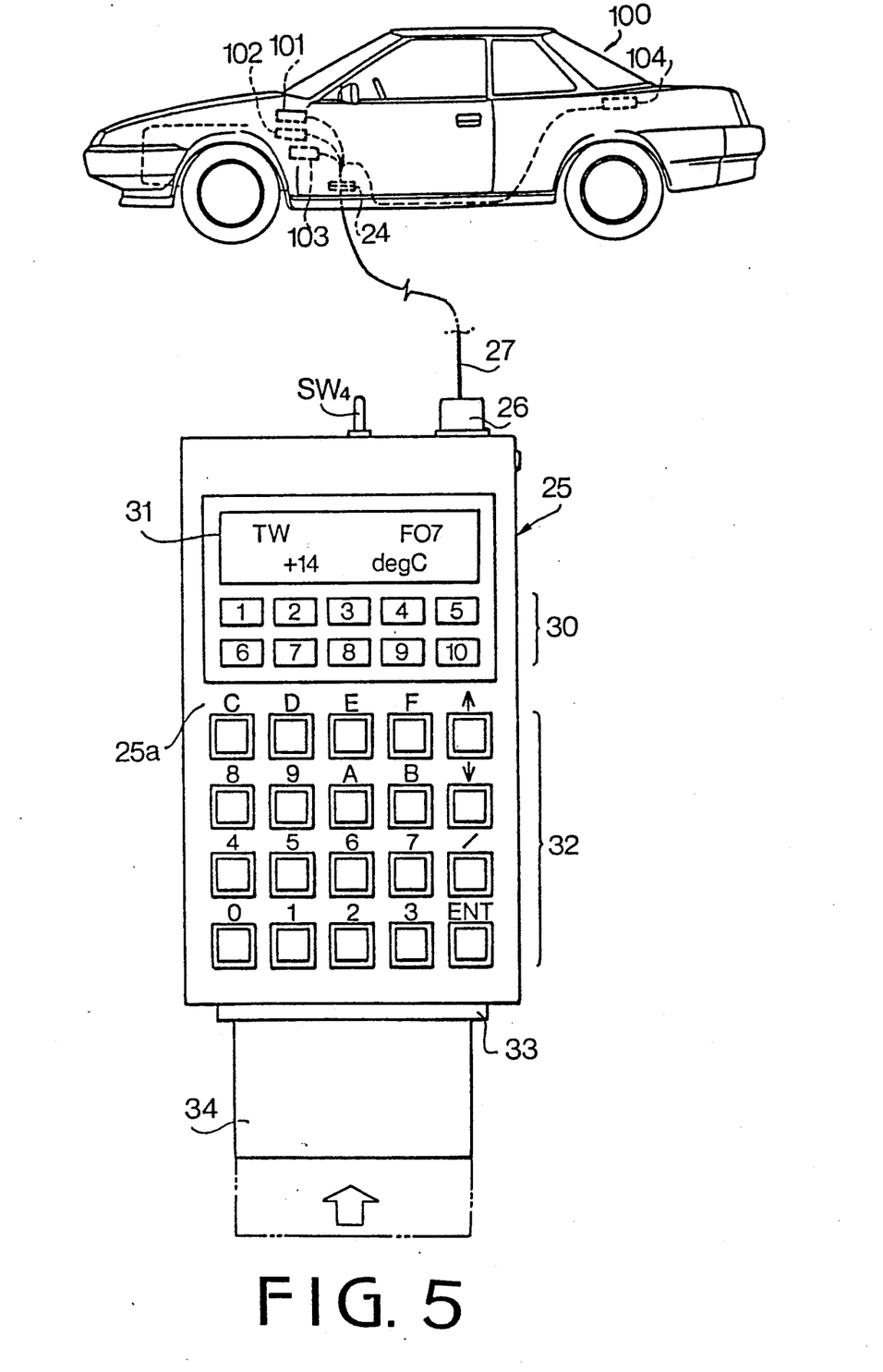
FIG. 5 is a schematic illustration of a second embodiment of the present invention.

Referring to FIG. 5 showing a second embodiment of the present invention, an automobile 100 is equipped with an electronic control system comprising a plurality of electronic control units for controlling various components of the automobile 100 such as an electronic engine control system 101 for controlling air-fuel ratio of the engine and other things, an electronic transmission control system 102, an electronic brake control system 103 for controlling an antilock brake system, and an electronic cruise control system 104 for constant speed drive of the automobile. These electronic control systems are connected to the external connector 24.

In the second embodiment, since the diagnosis device 25 has the same structure as the first embodiment, description thereof is omitted. Other structures which are the same as the previous embodiment and the same parts thereof are identified with the same reference numerals as FIGS. 1 to 4.

Figure 6A:
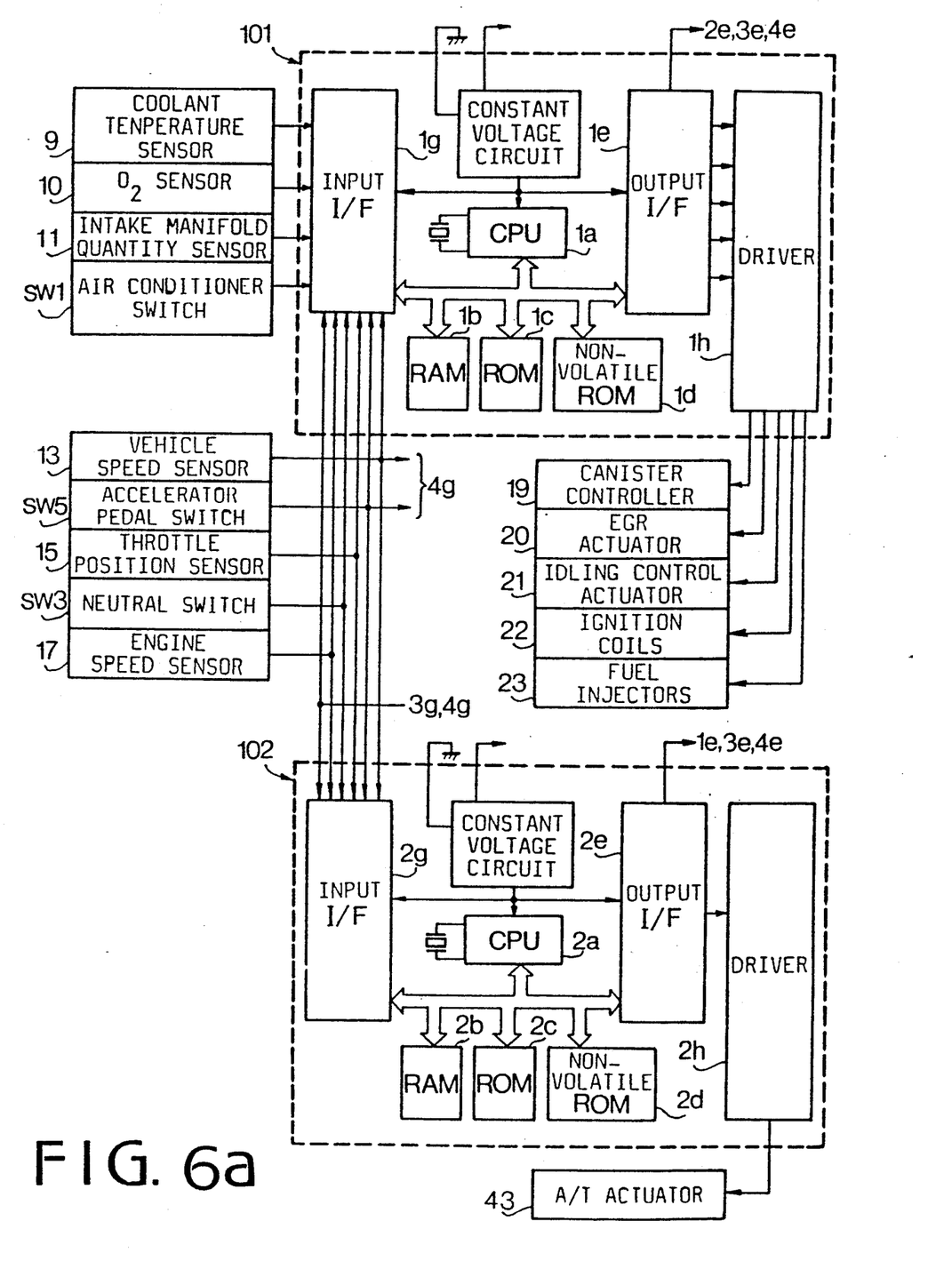
FIGS. 6a to 6c show a block diagram of a diagnosis system of FIG. 5.
Figure 6B:
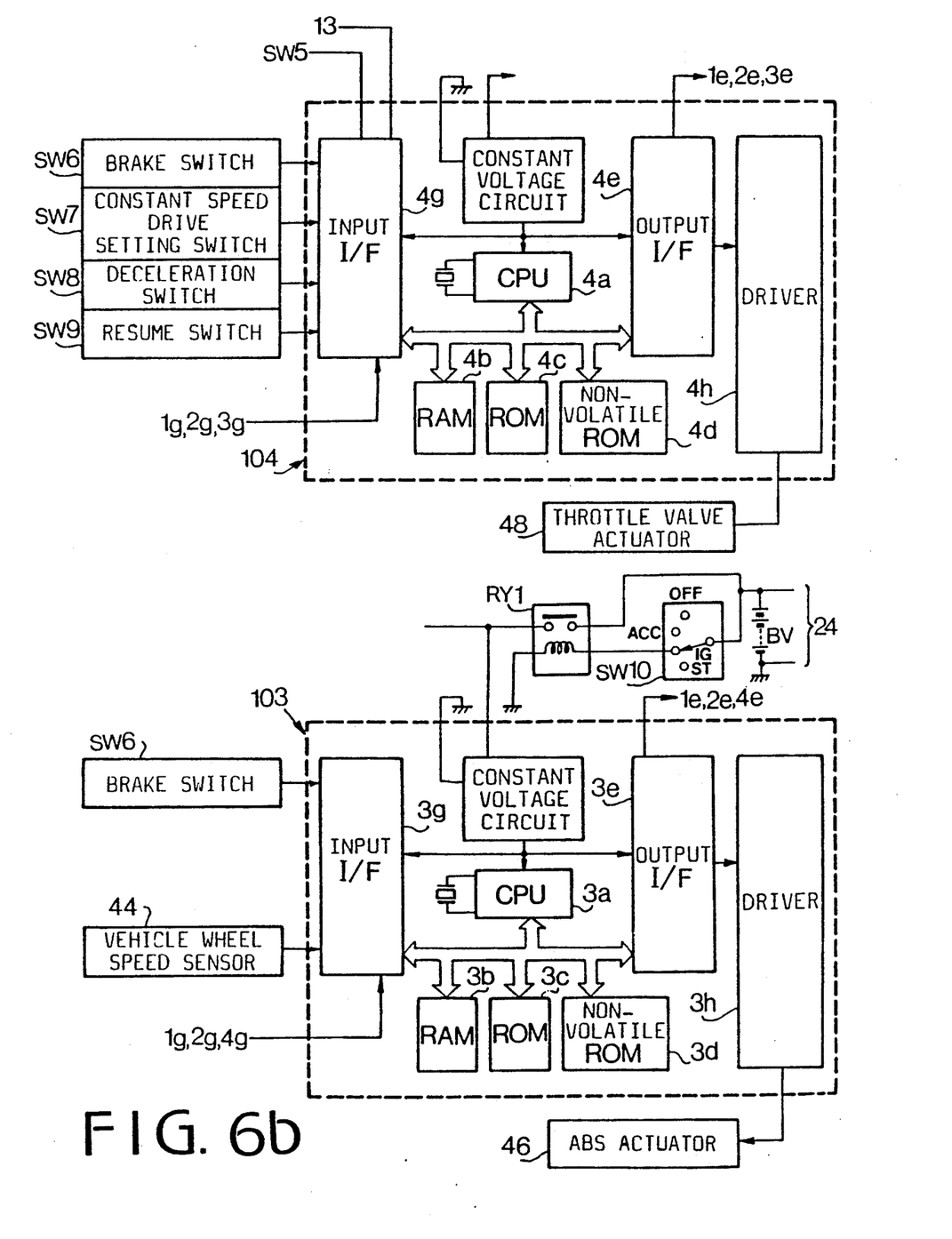
Figure 6C:
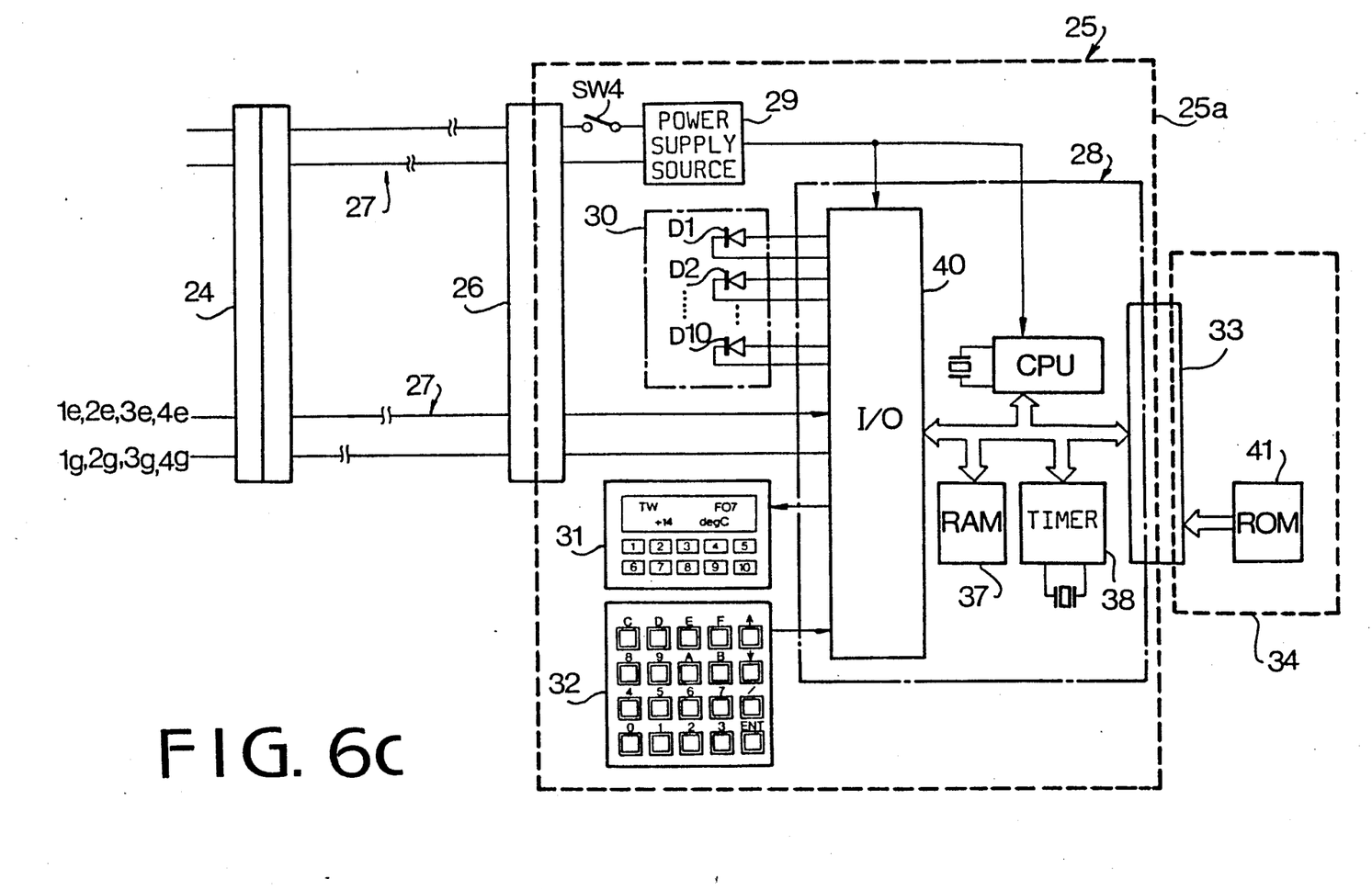

Referring to FIGS. 6a to 6c, the electronic control system 101, 102, 103 and 104 have central processor units (CPUs) 1a, 2a, 3a and 4a, random access memories (RAMs) 1b, 2b, 3b and 4b, read only memories (ROMs) 1c, 2c, 3c and 4c, non-volatile random access memories (non-volatile RAMs) 1d, 2d, 3d and 4d, input interfaces 1g, 2g, 3g and 4g, and output interfaces 1e, 2e, 3e and 4e, respectively. The CPU, RAMs, ROM, input and output interfaces in each control system are connected to each other through a bus line. In the RAMs 1b to 4b, various processed parameters and tables are stored. Programs and data for controlling the engine and fixed data such as the type of the vehicle are stored in the ROMs 1c to 4c. Power is supplied to the CPUs, input and output interfaces, and drivers of control systems from the source BV.

The electronic engine control system 101 receives signals from the coolant temperature sensor 9, the O₂ sensor 10, the intake manifold pressure sensor 11, the air conditioner switch SW1, the vehicle speed sensor 13, an accelerator pedal switch SW5, the throttle position sensor 15, a neutral switch SW3 and an engine speed sensor 17 through the input interface 1g.

These signals are stored in the RAM 1b after the processing of data in accordance with the program stored in the ROM 1c. The CPU 1a produces respective control signals, which are applied to a driver 1h through the output interface 1e. The driver 1h produces signals for controlling the canister controller 19, the actuator 20, the idling control actuator 21, ignition coils 22 and fuel injectors 23.

The electronic transmission control system 102 receives signals from the engine speed sensor 17, vehicle speed sensor 13, accelerator pedal switch SW5, throttle position 10 sensor 15 and neutral switch SW3 through the input interface 2g. The CPU 2a produces a signal which is supplied to an A/T (automatic transmission) actuator 43 through the output interface 2e and a driver 2h, for controlling the transmission in response to driving conditions.

The electronic brake control system 103 receives signals from a brake switch SW6 and a vehicle wheel speed sensor 44 through the input interface 3g. These signals are processed in accordance with the program stored in the ROM 3c for controlling an antilock brake system. A control signal is applied to an ABS actuator 46 through the output interface 3e and a driver 3h.

The electronic cruise control system 104 is supplied with signals from a constant speed drive setting switch SW7 and vehicle speed sensor 13 through the input interface 4g. A control signal is supplied to a throttle valve actuator 48 through the output interface 4e and a driver 4h for controlling constant speed drive of the vehicle. When signals from the brake switch SW6, the accelerator pedal switch SW5, a deceleration switch SW8 and a resume switch SW9 are supplied to the input interface 4g, release of the constant speed drive or decelerated constant speed drive are performed.

In these control systems 101, 102, 103 and 104, input interfaces 1g to 4g are connected to each other in parallel and output interfaces 1e to 4e are connected to each other in parallel so that bus lines comprising signal transmitting lines and signal receiving lines are formed. These lines are connected to the connector 24.

Figure 7A:
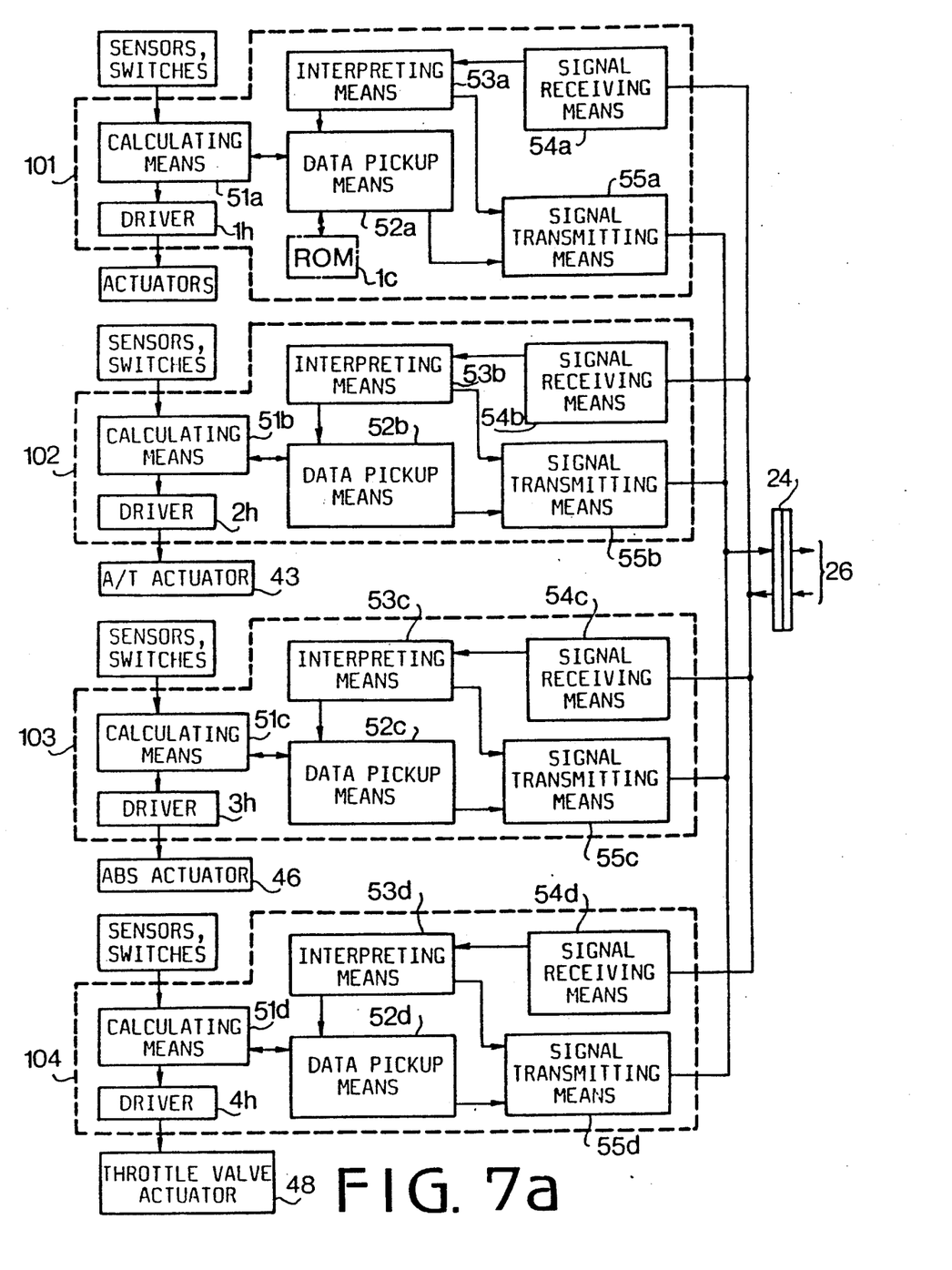
FIGS. 7a and 7b show a block diagram showing a main part of the system of FIG. 5.
Figure 7B:
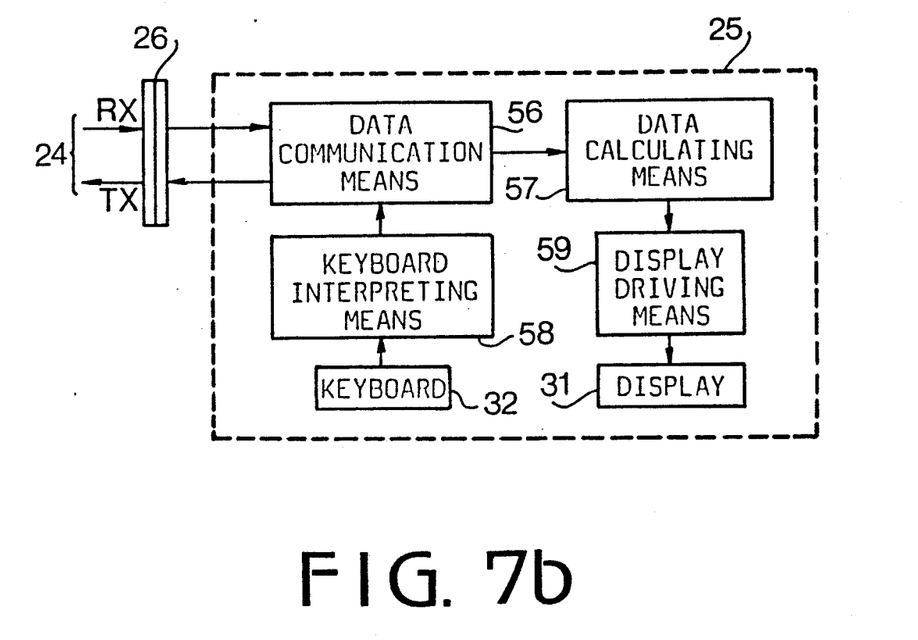

Referring to FIG. 7, each of the control systems 101 to 104 has the same structure as the control system 2 of the first embodiment. Namely, calculating means 51a to 51d, data pickup means 52a to 52d, interpreting means 53a to 53d, signal receiving means 54a to 54d, and signal transmitting means 55a to 55d are provided in the control systems 101 to 104, respectively.

Signal transmitting means 55a to 55d are connected to each other in parallel. Signal receiving means 54a to 54d are connected to each other in parallel. These signal receiving means and transmitting means are connected to the connector 24 through bus lines.

The operation of the diagnosis system is described hereinafter with reference to the flowchart of FIGS. 4a and 4b in the same manner as the first embodiment. The diagnosis device 25 is connected to the electronic control system 2 through the connectors 24, 26 and harness 27. The engine is started, and the following diagnosis program is performed under the running of the engine.

The power switch SW4 is turned on at a step S101. At a step S102, initialization of the control unit 28 is performed. At a step S103, a data demand signal TX from the data communication means 56 is applied to the engine control system 101. The data demand signals TX are previously stored in the ROM 1c.

Figure 8:
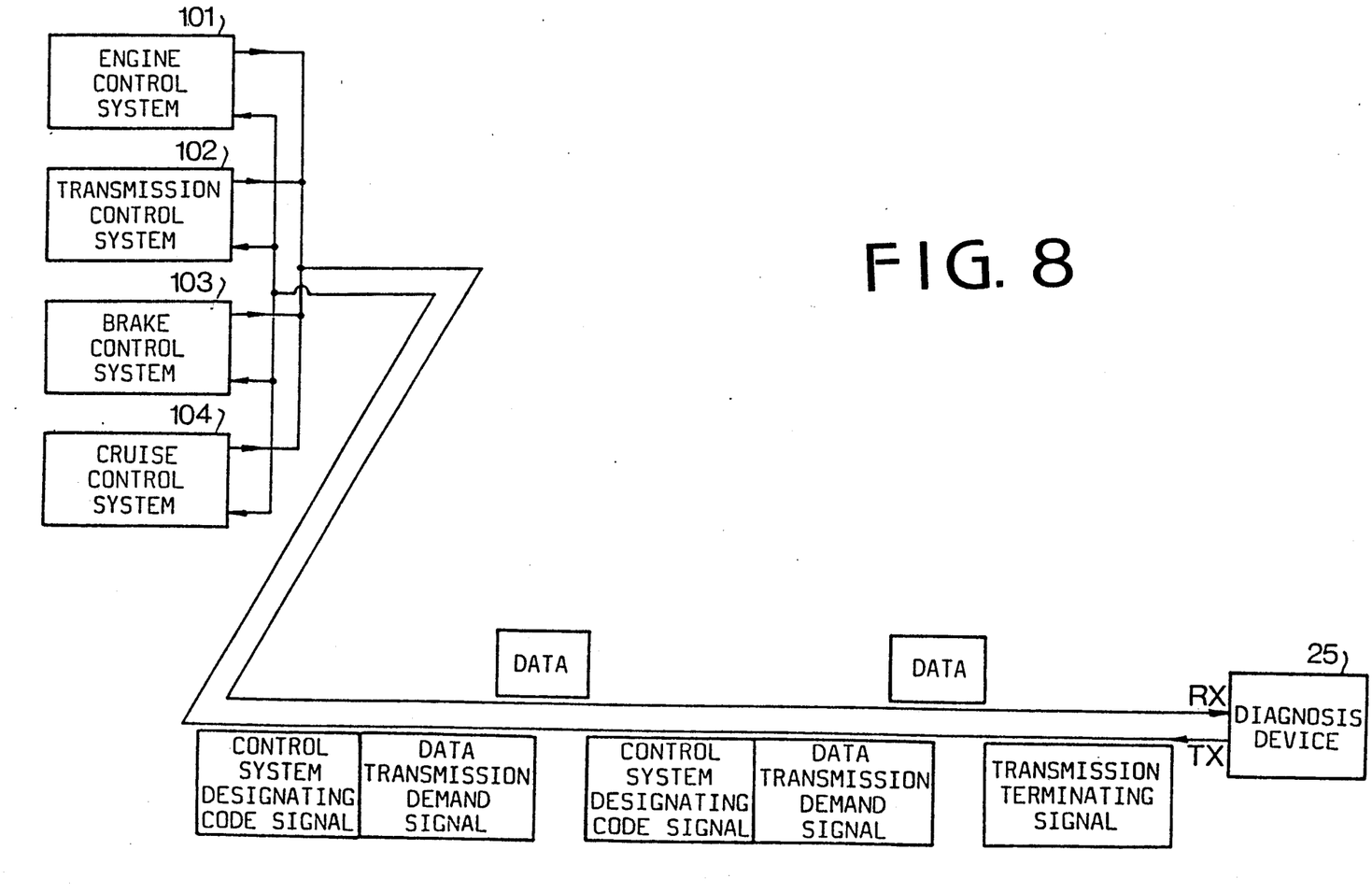
FIG. 8 is a diagram showing a data communication procedure between the electronic control system and the diagnosis device of the second embodiment.

As shown in FIG. 8, the data demand signal TX comprises a control system designating code signal and a data transmission demand signal. The data transmission demand signal includes a demand signal for demanding an identification code of the control system. The data demand signal TX is supplied from the diagnosis device 25 to the control systems 101 to 104 in the order of a control system designating code signal and a data transmission demand signal. That is, an engine control system designating code signal is supplied first and next the data transmission demand signal.

When the control system designating code signal is applied to control systems 101 to 104, actual operation in each system is interrupted and the program proceeds to a step S201 of an interrupt routine shown in FIG. 4b.

At step S201, it is determined whether a signal transmitting flag corresponding to the data transmission demand signal is "1" in each of the interpreting means 53a to 53d of the systems 101 to 104 or not. If the identification code demand signal is fed for the first time, the signal transmitting flag is "0". Thus, the program goes to a step S202 where each of the interpreting means 53a to 53d determines whether the control system designating demand signal is applied to respective signal receiving means 54a to 54d or not. In this program, since the code of the engine control system 101 is designated, the program for the engine control system 101 proceeds to a step S203 and programs for the other control systems 102 to 104 proceed to an exit to terminate the interrupt routine.

At that time, since the signal transmitting flag in each of the other control systems 102 to 104 is "0", the bus lines of the signal transmitting means 55b to 55d to the diagnosis device 25 are opened.

At step S203, the signal transmitting flag of the engine control system 101 is set to "1", and a signal transmitting start signal is fed from the interpreting means 53a to the signal transmitting means 55a. Thus, the signal transmitting means is connected to the diagnosis device 25. The program goes to a step S204 where the interpreting means 53a supplies a signal to the data pickup means 52a to read out an identification code data from the data stored in the ROM 1c. A derived identification code data signal is fed from the signal transmitting means 55a to the diagnosis device 25.

At a step S205, it is determined whether the interpreting means 53a receives a signal demanding to terminate the signal transmission from the diagnosis device 25 or not. When the termination of the signal transmission is determined, the program goes to a step S206 where the signal transmitting flag is set to "0" and a terminating signal is applied from the interpreting means 53a to the signal transmitting means 55a to open the transmission line to the diagnosis device 25. When the termination demand signal is not received, the interrupt routine terminates.

When the interrupt routine terminates, the main program is resumed. At a step S104, it is determined whether the identification code signal is applied to the control unit 28 or not. If the identification code signal is applied, the program proceeds to a step S105. If not, the program of step S104 is repeated. At step S105, a received code is stored in a predetermined address of the RAM 37. At a step S106, in accordance with the received code, a program for the type of the control system is selected from the ROM 41 in the cartridge 34.

Thus, a diagnosis routine is performed in accordance with the program.

The diagnostician operates the keyboard 32 to perform the diagnosis of the engine control system 101. For example, in order to measure the coolant temperature, a mode code for the coolant temperature (for example F→0→7→ENT) is input by operating the keyboard 32 at a step S107. The input mode is read by the CPU 36 and temporarily stored in the RAM 37. Thereafter, the mode is read and interpreted in the keyboard interpreting means 58. A program according to a mode 07 representing a coolant temperature sensor output data program is read out. At a step 108, a corresponding data demand signal TX (for example, coolant temperature data in the engine control system 101) is applied to a corresponding control system from the data communication means 56 in such an order as shown in FIG. 8.

In control systems 101 to 104, programs of interrupt routines are started. As described above, the signal transmitting flags in control systems 102 to 104 are "0", and programs for the systems 102 to 104 go from step S201 to step S202 and to the exit.

On the other hand, the engine control system 101 is in the signal transmitting state for the identification code demand signal and the signal transmitting flag remains "1". Thus, the program goes from step S201 to step S204 where a data demand signal TX for coolant temperature is interpreted at the interpreting means 53a. The data demand signal TX for coolant temperature is applied to the data pickup means 52a. The data pickup means 52a interrupts the identification code pickup operation and operates to pick up coolant temperature data which is supplied to the diagnosis device 25 through the signal transmitting means 55a. At a step S109, data signal RX representing a coolant temperature is applied to the data communication means 56 from the engine control system 101. At a step S110, the received binary digits are converted into decimal digits representing the coolant temperature in the data calculating means 57.

The driving means 59 produces calculated data which is applied to the display 31. At a step S111, a measured value of the coolant temperature, for example, +14 deg C. representing the temperature, an abbreviation mark TW of coolant temperature, and the input mode indiction F07 are displayed on the display 31 as shown in FIG. 5. Thus, the diagnostician can diagnose the items about the coolant temperature.

In order to perform other diagnosis items, for example, to diagnose vehicle wheel speed data based on a signal from the vehicle wheel speed sensor 44 of the brake control system 3, the diagnostician operates the keyboard 32 to input a mode code for the vehicle wheel speed (for example F →B→1→ENT) (step S107). The input mode is read and interpreted at the keyboard interpreting means 58. At step S108, a corresponding data demand signal TX for vehicle wheel speed is applied to the control systems 101 to 104 in the order of a brake control system designating code signal and a data transmission demand signal.

At that time, the engine control system 101 is under the condition for transmitting the coolant temperature data. Accordingly, when the interpreting means 53a of the control system 101 receives the data demand signal TX for the brake control system 103, the interpreting means 53a regards the data demand signal TX as a signal transmission terminating demand signal at step S205. Thus, the program proceeds to step S206 where the signal transmitting flag is set to "0". The interpreting means 53a produces a signal transmission terminating signal which is applied to the signal transmitting means 55a and the data pickup means 52a. The signal transmitting operation of the means 55a is terminated so that the line to the diagnosis device 25 is opened. The data pickup means 52a terminates the pickup operation for the coolant temperature data.

Simultaneously, control systems 102 to 104 start the interrupt routine. The signal transmitting flags of the control systems 102 to 104 are "0" at a step S201 and hence the programs go to a step S202. Since the brake control system code is designated, the program of the brake control system 103 goes to a step S203. Programs of the control systems 102 and 104 go to the exit to terminate the interrupt programs.

At step S203, the signal transmitting flag of the brake control system 103 is set to "1", and a signal transmitting start signal is fed from the interpreting means 53c to the signal transmitting means 55c. Thus, the signal transmitting means is connected to the diagnosis device 25. The program goes to a step S204 where the interpreting means 53c supplies a signal to the data pickup means 52c to read out the vehicle wheel speed data from the data stored in the ROM 3c. A derived identification code data signal is fed from the signal transmitting means 55c to the diagnosis device 25.

At a step S109, data signal RX representing the vehicle wheel speed is applied to the data communication means 56 from the control system 103. At a step S110, the received binary digits are converted into decimal digits representing the vehicle wheel speed in the data calculating means 57. At a step S111, a calculated value of the vehicle wheel speed is displayed on the display 31.

Finally, when the switch SW4 is turned off, the signal transmission terminating demand signal is applied to control the systems 101 to 104. The program of the brake control system 103 goes from step a S205 to a step S206 where the signal transmitting flag is set to "0". A terminating signal is applied from the interpreting means 53c to the data pickup means 52c and the signal transmitting means 55c to terminate the signal transmitting operation of the brake control system 103.

In the present invention, diagnosis of a plurality of electronic control systems 101 to 104 can be performed by connecting them to the diagnosis device 25 through the single external connector 24. For example, the vehicle speed data from the vehicle speed sensor 13, which is necessary for diagnosing the engine control system 101, transmission control system 102, and cruise control system 104, can be diagnosed by inputting a corresponding diagnosis mode through the keyboard 32. More particularly, if vehicle speed data in all of the control systems 101, 102 and 104 are abnormal, it is diagnosed that the vehicle speed sensor 13 is in trouble. If vehicle speed data in one of the control systems 101, 102 and 104 is abnormal, trouble such as a faulty contact of the connector or a short circuit in the control system and the sensor 13, breaking of wires, or malfunctioning of that control system are assumed.

In accordance with the present invention, data transmission from the control system to the diagnosis device is terminated or interrupted without cutting off the power for the control system, so that the signal transmitting lines to the diagnosis device are opened. Thus, load exerted on the control system is reduced. Even if a plurality of control systems have trouble, data transmission can be smoothly performed. Thus, workability is improved and trouble in the control systems can be easily found out.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A diagnosis system for diagnosing an electronic control system for an automotive engine vehicle, said electronic control system having sensing means for detecting operating conditions of the vehicle and control means for storing input data from said sensing means and providing output data for controlling the vehicle, and said diagnosis system having a control unit responsive to at least one of said data for diagnosing said at least one data and for providing diagnosis data, display means for displaying said diagnosis data, a keyboard for inputting a diagnosis mode into said control unit, connecting means for connecting said control unit with said electronic control system and a detachable memory cartridge detachably connected to said control unit for storing a plurality of programs for diagnosing said at least one data, system further comprising:

first signal transmitting means provided in the diagnosis system for transmitting a data demand signal and a transmission terminating demand signal to the electronic control system;

signal receiving means provided in the electronic control system for receiving said signals from the diagnosis system;

interpreting means provided in the electronic control system for interpreting a content of the received data demand signal and the transmission terminating demand signal; and second signal transmitting means provided in the electronic control system for transmitting an output signal to the diagnosis system in accordance with an interpretation through the interpreting means such that a diagnosis operation continues without cutting off power for the electronic control system.

2. The system according to claim 1, wherein the diagnosis system includes a computer having a central processing unit and a memory, the memory having a plurality of diagnosis programs for diagnosing the electronic control system comprising a plurality of electronic control units, and said display means for indicating results of diagnosis.

* * * * *